US012763319B2

(12) United States Patent
Shin et al.

(10) Patent No.: US 12,763,319 B2
(45) Date of Patent: Oct. 13, 2026

(54) NEGATIVE ACTIVE MATERIAL FOR RECHARGEABLE LITHIUM BATTERY, NEGATIVE ELECTRODE FOR RECHARGEABLE LITHIUM BATTERY, AND RECHARGEABLE LITHIUM BATTERY INCLUDING SAME

(71) Applicant: SAMSUNG SDI CO., LTD., Yongin-si (KR)

(72) Inventors: Changsu Shin, Yongin-si (KR); Jongmin Kim, Yongin-si (KR); Jongmin Won, Yongin-si (KR); Youngugk Kim, Yongin-si (KR); Jaemyung Kim, Yongin-si (KR); Jaehou Nah, Yongin-si (KR); Dae-Hyeok Lee, Yongin-si (KR); Jungho Lee, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 1 day.

(21) Appl. No.: 18/012,458

(22) PCT Filed: Oct. 27, 2021

(86) PCT No.: PCT/KR2021/015215

§ 371 (c)(1),
(2) Date: Dec. 22, 2022

(87) PCT Pub. No.: WO2023/074934

PCT Pub. Date: May 4, 2023

(65) Prior Publication Data

US 2024/0120466 A1 Apr. 11, 2024

(51) Int. Cl.
*H01M 4/133* (2010.01)
*H01M 4/134* (2010.01)
(Continued)

(52) U.S. Cl.
CPC ........... *H01M 4/366* (2013.01); *H01M 4/133* (2013.01); *H01M 4/134* (2013.01); *H01M 4/136* (2013.01);
(Continued)

(58) Field of Classification Search
None
See application file for complete search history.

(56) References Cited

U.S. PATENT DOCUMENTS

2015/0086870 A1* 3/2015 Fukasawa ............ H01M 4/131 429/218.1
2016/0344019 A1* 11/2016 Hirose ................ H01M 4/0445
(Continued)

FOREIGN PATENT DOCUMENTS

JP 2020-113495 A 7/2020
JP 2021-061101 A 4/2021
(Continued)

OTHER PUBLICATIONS

English translation of KR20170039922 (Year: 2017).*
(Continued)

*Primary Examiner* — Yoshitoshi Takeuchi
(74) *Attorney, Agent, or Firm* — Lee IP Law, P.C.

(57) ABSTRACT

Provided is that a negative active material for a rechargeable lithium battery, a negative electrode for a rechargeable lithium battery including the same, and a rechargeable lithium including the same, and the negative active material for a rechargeable lithium battery includes an agglomerated product of silicon-based materials comprising a silicon particle, a lithium silicate positioned on a surface of the silicon particle, a first amorphous carbon surrounded on the silicon particle and the lithium silicate; and a second amorphous carbon positioned on the agglomerated product.

13 Claims, 3 Drawing Sheets

1

(51) Int. Cl.

| | |
|---|---|
| ***H01M 4/136*** | (2010.01) |
| ***H01M 4/1395*** | (2010.01) |
| ***H01M 4/36*** | (2006.01) |
| ***H01M 4/38*** | (2006.01) |
| ***H01M 4/58*** | (2010.01) |
| ***H01M 4/587*** | (2010.01) |
| ***H01M 10/0525*** | (2010.01) |
| *H01M 4/02* | (2006.01) |

(52) U.S. Cl.

CPC ......... *H01M 4/386* (2013.01); *H01M 4/5825* (2013.01); *H01M 4/587* (2013.01); *H01M 10/0525* (2013.01); *H01M 2004/021* (2013.01); *H01M 2004/027* (2013.01)

(56) References Cited

U.S. PATENT DOCUMENTS

| | | | | |
|---|---|---|---|---|
| 2016/0372753 | A1* | 12/2016 | Fukasawa | H01M 10/052 |
| 2017/0117538 | A1 | 4/2017 | Bendimerad et al. | |
| 2017/0117539 | A1* | 4/2017 | Ogata | H01M 4/0419 |
| 2017/0117543 | A1* | 4/2017 | Park | H01M 4/1391 |
| 2017/0200943 | A1* | 7/2017 | Kawakami | H01G 11/40 |
| 2019/0006661 | A1* | 1/2019 | Matsuno | H01M 4/366 |
| 2019/0051897 | A1* | 2/2019 | Kamo | H01M 4/5825 |
| 2020/0194785 | A1* | 6/2020 | Jung | H01M 4/625 |
| 2020/0280059 | A1 | 9/2020 | Choi et al. | |
| 2020/0280062 | A1 | 9/2020 | Shin et al. | |
| 2020/0313173 | A1 | 10/2020 | Oh et al. | |
| 2020/0343544 | A1* | 10/2020 | Choi | H01M 4/5825 |
| 2020/0350571 | A1 | 11/2020 | Lee et al. | |
| 2020/0350591 | A1* | 11/2020 | Uchiyama | H01M 4/5825 |
| 2020/0388833 | A1* | 12/2020 | Lee | H01M 4/625 |
| 2021/0135209 | A1* | 5/2021 | Hayner | H01M 10/0525 |
| 2021/0151746 | A1 | 5/2021 | Won et al. | |
| 2021/0351432 | A1 | 11/2021 | Choi et al. | |
| 2022/0029151 | A1* | 1/2022 | Sato | H01M 4/38 |
| 2022/0069297 | A1 | 3/2022 | Takahashi et al. | |
| 2022/0376238 | A1 | 11/2022 | Hirose et al. | |
| 2023/0307612 | A1* | 9/2023 | Sato | H01M 4/485 |
| 2025/0167220 | A1* | 5/2025 | Jin | H01M 4/366 |

FOREIGN PATENT DOCUMENTS

| | | | | | |
|---|---|---|---|---|---|
| KR | 10-2012-0089512 | A | | 8/2012 | |
| KR | 10-2014-0085822 | A | | 7/2014 | |
| KR | 20170039922 | A | * | 4/2017 | H01M 4/386 |
| KR | 10-2017-0048211 | A | | 5/2017 | |
| KR | 10-2017-0137000 | A | | 12/2017 | |
| KR | 10-2019-0029044 | A | | 3/2019 | |
| KR | 10-2019-0043856 | A | | 4/2019 | |
| KR | 10-2019-0052951 | A | | 5/2019 | |
| KR | 10-2019-0104895 | A | | 9/2019 | |
| KR | 10-2020-0073350 | A | | 6/2020 | |
| KR | 10-2020-0105402 | A | | 9/2020 | |
| KR | 10-2021-0061008 | A | | 5/2021 | |

OTHER PUBLICATIONS

Korean Office Action dated Jun. 21, 2024, of the corresponding Korean Patent Application No. 10-2020-0136955.

European Search Report dated Oct. 18, 2024.

Korean Office Action dated Mar. 21, 2024 for corresponding Korean Patent Application No. 10-2020-0136955.

International Search Report dated Jul. 25, 2022 for PCT/KR2021/015215.

* cited by examiner

NEGATIVE ACTIVE MATERIAL FOR RECHARGEABLE LITHIUM BATTERY, NEGATIVE ELECTRODE FOR RECHARGEABLE LITHIUM BATTERY, AND RECHARGEABLE LITHIUM BATTERY INCLUDING SAME

CROSS REFERENCE TO RELATED APPLICATIONS

This is the U.S. national phase application based on PCT Application No. PCT/KR2021/015215, filed Oct. 27, 2021, the entire contents of all of which are hereby incorporated by reference.

TECHNICAL FIELD

It relates to a negative active material for a rechargeable lithium battery, a negative electrode for a rechargeable lithium battery including the same, and a rechargeable lithium battery including the same.

BACKGROUND ART

Rechargeable lithium batteries are attracting attention as power sources for various electronic devices because of high discharge voltage and high energy density.

As for positive active materials of rechargeable lithium batteries, a lithium-transition metal oxide having a structure capable of intercalating lithium ions such as $LiCoO_2$, $LiMn_2O_4$, $LiNi_{1-x}Co_xO_2$ ($0<x<1$), and the like has been used.

As for negative active materials, various carbon-based materials such as artificial graphite, natural graphite, and hard carbon capable of intercalating and deintercalating lithium ions or a silicon-based active material have been used. Among these, graphite such as artificial graphite, natural graphite, and the like is mainly used, but it has low capacity of about 360 mAh/g, and studies on a silicon-based active material having four times or more capacity than graphite have been actively undertaken.

Technical Problem

One embodiment provides a negative active material for a rechargeable lithium battery exhibiting excellent high-rate characteristics and cycle-life characteristics, and reduction in ionic resistance.

Another embodiment provides a negative electrode for a rechargeable lithium battery including the negative active material.

Still another embodiment provides a rechargeable lithium battery including the negative electrode.

Technical Solution

According to one embodiment, a negative active material for a rechargeable lithium battery including: an agglomerated product of silicon materials including a silicon particle, a lithium silicate positioned on a surface of the silicon particle, a first amorphous carbon surrounded on the silicon particle and the lithium silicate; and a second amorphous carbon positioned on the agglomerated product, is provided.

The silicon particle may have a nanosize. In one embodiment, the silicon particle may have a particle diameter of 5 nm to 300 nm.

When X-ray diffraction analysis is measured for the negative active material for the rechargeable lithium battery using a CuKα ray, a peak intensity ratio ($I_{lithium\ silicate\ (020)}/I_{Si\ (111)}$) of peak intensity ($I_{lithium\ silicate\ (020)}$) of a lithium silicate (020) plane to peak intensity ($I_{Si\ (111)}$) at a Si (111) plane may be 0.1 to 1.2.

The lithium silicate may be $Li_2SiO_3$, $Li_4SiO_4$, $Li_2Si_2O_5$, or combinations thereof.

The agglomerated product may further include crystalline carbon.

An amount of the lithium silicate may be 0.1 wt % to 20 wt % based on the total 100 wt % of the negative active material for the rechargeable lithium battery.

Another embodiment provides a negative electrode for a rechargeable lithium battery including a current collector and a negative active material layer including the negative active material.

The negative active material layer may further include a crystalline carbon negative active material.

In X-ray diffraction analysis to the negative electrode of the rechargeable lithium battery using CuKα ray, a peak intensity ratio ($I_{lithium\ silicate\ (020)}/I_{graphite\ (002)}$) of peak intensity ($I_{lithium\ silicate\ (020)}$) at a lithium silicate (020) plane to peak intensity ($I_{graphite\ (002)}$) at a graphite (002) plane may be 0.01 to 0.5.

Still another embodiment provides a rechargeable lithium battery including: the negative electrode; a positive electrode including a positive active material; and a non-aqueous electrolyte.

Other embodiments are included in the following detailed description.

Advantageous Effects

The negative active material for the rechargeable lithium battery according to one embodiment may exhibit excellent initial efficiency and cycle-life characteristics.

MODE FOR INVENTION

Hereinafter, embodiments of the present invention are described in detail. However, these embodiments are exemplary, the present invention is not limited thereto and the present invention is defined by the scope of claims.

Figure 1:
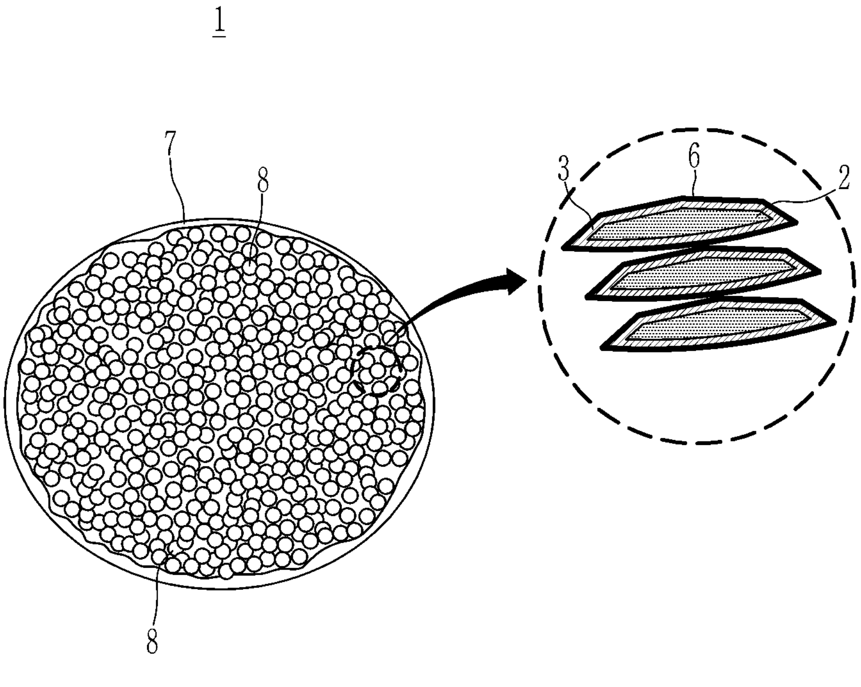
FIG. 1 is a schematic view of a negative active material for a rechargeable lithium battery according to one embodiment.

A negative active material for a rechargeable lithium battery according to one embodiment includes: an agglomerated product of silicon-based materials including a silicon particle, a lithium silicate positioned on a surface of the silicon particle, and a first amorphous carbon surrounded on the silicon particle and the lithium silicate; and a second amorphous carbon positioned on the agglomerated product. FIG. 1 schematically shows the negative active material, and the negative active material 1 includes the agglomerated product of the silicon-based material 8, and a second amorphous carbon 7 positioned on the agglomerated product. As shown enlarged in FIG. 1, the silicon-based material 9 includes a silicon particle 2, a lithium silicate 3 positioned on the silicon particle, and a first amorphous carbon 6 surrounded on the silicon particle 2 and the lithium silicate 5.

The agglomerated product may further include crystalline carbon. When the agglomerated product further includes crystalline carbon, higher-capacity and lower resistance may be exhibited.

The silicon particle may have a nanosize, and for example, a particle diameter of 5 nm to 300 nm. The size of the silicon particle within the range renders to suppress the volume expansion which may be caused during charge and discharge and to have a long cycle-life.

In the specification, a particle diameter may be an average particle diameter of particles. In this case, the average particle diameter may mean a particle diameter (D50) measured as a cumulative volume. When a definition is not otherwise provided, an average particle diameter indicates an average particle diameter (D50) where a cumulative volume is about 50 volume % in a particle distribution.

The average particle diameter (D50) may be measured by a method that is well known to those skilled in the art, for example, by a particle size analyzer, or by a transmission electron microscopic image or a scanning electron microscopic image. Alternatively, a dynamic light-scattering measurement device is used to perform a data analysis, and the number of particles is counted for each particle size range, and from this, the average particle diameter (D50) value may be easily obtained through a calculation.

The silicon particle is a particle of only Si on which an oxidation layer may be naturally formed on the surface, which may be readily converted to a silicate, but if the silicon particle is presented in the form of an oxide such as $SiO_x$, oxygen is uniform inside of the active material, and thus it is difficult to selectively convert all parts on which oxygen positioned, and as a result, it is undesirable.

An amount of the silicon particles may be 30 wt % to 70 wt % based on total 100 wt % of the negative active material, or may also be 30 wt % to 60 wt %. When the amount of the silicon particles is within the range, high capacity and a long cycle-life may be obtained.

The negative active material according to one embodiment may have a peak intensity ratio ($I_{lithium\ silicate\ (020)}/I_{Si\ (111)}$) of peak intensity ($I_{lithium\ silicate\ (020)}$) at a lithium silicate (020) plane to peak intensity ($I_{Si\ (111)}$) at a Si (111) plane using CuKα ray. When the peak intensity ratio ($I_{lithium\ silicate\ (020)}/I_{Si\ (111)}$) is 0.1 to 1.2, the initial efficiency may be more improved and more excellent cycle-life characteristics may be exhibited. Particularly, the peak intensity ratio ($I_{lithium\ silicate\ (020)}/I_{Si\ (111)}$) of 0.1 to 0.5 renders to more maximize the specific capacity and the initial efficiency characteristics.

The lithium silicate may be $Li_2SiO_3$, $Li_4SiO_4$, $Li_2Si_2O_5$, or combinations thereof. Furthermore, an amount of the lithium silicate may be 0.1 wt % to 20 wt %, or 1 wt % to 20 wt % based on the total 100 wt % of the negative active material for the rechargeable lithium battery. The amount of the lithium silicate within the range may improve the initial efficiency.

As such, the negative active material according to one embodiment includes lithium silicate positioned on the surface of the silicon particles, and thus, during charging and discharging, the generation of the irreversible product, lithium silicate from the silicon oxide which may be formed by oxidizing silicon in the preparation of the silicon particle, in particular, in the preparation of the silicon nanoparticles, may be effectively prevented, thereby improving the cycle-life characteristics. As the surface of the silicon particle is coated with lithium silicate, there is no area which contacts with lithium to react, and thus, there is substantially no silicon participating in the generation of an irreversible product, lithium silicate, thereby mostly silicon of the negative active material participates in the charge and discharge reaction.

As such, the negative active material according to one embodiment may have high capacity and the improvement in the cycle-life characteristics by solving the reductions in the battery efficiency and capacity due to the generation of the irreversible product, lithium silicate, during charging and discharging, which is prepared from a silicon oxide which may be prepared on a surface of silicon in preparing nanosilicon. This is because silicon oxide participating in the lithium silicate generation rarely exists so that silicon included in the negative active material may mostly participate in the charging and the discharge reaction.

The lithium silicate may be continuously positioned on a surface of the silicon particle in a layer form, or discontinuously positioned thereon in an island form. In positioning lithium silicate in the layer form, the thickness may be 1 nm to 10 nm. When the thickness of lithium silicate is within the range, the initial efficiency may be more improved.

The first amorphous carbon may be positioned by surrounding on the silicon particle and the lithium silicate, and may be continuously positioned by surrounding thereon in the layer form, or discontinuously positioned in the island form. In case of positioning the first amorphous carbon in the layer form, the thickness may be 1 nm to 100 nm, 1 nm to 80 nm, 1 nm to 50 nm, or 1 nm to 30 nm. When the thickness of the first amorphous carbon is within the range, the cycle-life characteristics may be more improved.

The second amorphous carbon is positioned on the agglomerated product, and the second amorphous carbon may also be continuously positioned by surrounding in the layer form or discontinuously positioned in the island form. When the second amorphous carbon is positioned in the layer form, the thickness may be 1 nm to 100 nm, 1 nm to 80 nm, 1 nm to 50 nm, or 1 nm to 30 nm. When the thickness of the second amorphous carbon is satisfied into the range, the cycle-life characteristics may be more improved.

In one embodiment, the amount of amorphous carbon included in the negative active material may be 30 wt % to 60 wt % based on the total, 100 wt % of the negative active material for the rechargeable lithium battery. The amount of amorphous carbon is the sum of the first amorphous carbon and the second amorphous carbon, and the amount within the range may impart a long cycle-life and high electrical conductivity.

The first amorphous carbon or the second amorphous carbon may be the same as or different from each other, and an example thereof may be soft carbon, hard carbon, mesophase pitch carbide, sintered coke, or combinations thereof.

Such a negative active material may be prepared by the following procedure.

A lithium source material and silicon particles are mixed in an organic solvent.

The organic solvent may be isopropyl alcohol, ethanol, butanol, diethylene glycol, or combinations thereof. The ethanol may be anhydrous ethanol.

The silicon particle may be silicon nanoparticles, or may be silicon nanoparticles obtained by adding silicon particles to an organic solvent and pulverizing it. The organic solvent may be used at a mixing ratio of the silicon particles and the organic solvent of 5:95 to 20:80 by weight ratio. The pulverization may be performed by a milling process such as ball milling, bead milling, and the like.

The lithium source material may be LiOH, $Li_2CO_3$, $Li_2O$, LiCl, or combinations thereof.

A mixing ratio of the lithium source material and the silicon particles may be 1:9 to 3:7 by weight ratio. When the mixing ratio of the lithium source material and the silicon particles is within the range, lithium silicate may be suitably formed in the prepared active material and the desired X-ray diffraction peak characteristics may be exhibited.

In addition, the mixture is mixed with a first amorphous carbon precursor. Herein, an amount of the first amorphous carbon precursor may be 10 parts by weight to 30 parts by weight based on 100 parts by weight of the mixture. When the amount of the first amorphous carbon precursor is within the range, the silicon nanoparticles may be uniformly coated.

The first amorphous carbon precursor may be petroleum-based coke, coal-based coke, petroleum pitch, coal pitch, green cokes, or combinations thereof.

In the mixing of the mixture and the first amorphous carbon precursor, crystalline carbon may be additionally added. The crystalline carbon may be natural graphite, artificial graphite, or combinations thereof. In case of additionally adding crystalline carbon, an amount of crystalline carbon may be 2 parts by weight to 50 parts by weight based on 100 parts by weight of the mixture. When the amount of crystalline carbon is within the range, electrical resistance may be more reduced.

The obtained mixture is dried to prepare a dried product. The drying may be performed by spray drying and the spray drying may render agglomeration of the silicon particles, the lithium source material, and the amorphous carbon precursor, thereby preparing an agglomerated product, to effectively dry and to more improve uniform mixability between the materials. The drying may be performed at 100° C. to 200° C. The drying at the temperature range renders rapid drying and minimization of the residual amount of the solvent.

Thereafter, the dried product is primarily heat treated. The primary heat-treatment may be performed at 700° C. to 900° C. When the primary heat-treatment is performed at the temperature range and the mixing ratio of the lithium source material and the silicon particles is within the range, lithium silicate is desirably formed in the prepared active material and the desired X-ray diffraction peak characteristics may be exhibited.

The primary heat-treatment may be performed under an atmosphere such as a nitrogen ($N_2$) atmosphere, or an argon (Ar) atmosphere. The performance of the secondary heat-treatment under such an atmosphere may prevent oxidation during the heat-treatment.

According to the primary heat-treatment, the silicon particles partially react with the lithium source material to generate lithium silicate which is positioned on the surface of the unreacted and remaining silicon particles. In addition, the first amorphous carbon precursor is carbonized to convert a first amorphous carbon which is positioned by surrounding on the silicon particles and the lithium silicate, thereby preparing an agglomerated product.

The agglomerated product is mixed with a second amorphous carbon precursor, and they are secondarily heat-treated to prepare a negative active material. The second amorphous carbon precursor may be petroleum-based coke, coal-based coke, petroleum pitch, coal pitch, green cokes, or combinations thereof. Herein, the second amorphous carbon precursor may be the same as or different from the first amorphous carbon precursor.

A mixing ratio of the agglomerated product and the second amorphous carbon precursor may be 70:30 to 80:20 by weight. When the mixing ratio of the agglomerated product and the second amorphous carbon precursor is satisfied in the range, the cycle characteristic and rate capability may be more improved.

The secondary heat-treatment may be performed at 700° C. to 1000° C. When the secondary heat-treatment is performed at the temperature range, the initial efficiency may be more improved. The secondary heat-treatment may be performed under a nitrogen ($N_2$) atmosphere or an argon (Ar) atmosphere. The performance of the secondary heat-treatment under such an atmosphere may effectively prevent oxidation which may occur during the heat-treatment.

According to the secondary heat-treatment, the second amorphous carbon precursor is carbonized to convert amorphous carbon, thereby positioning it on the agglomerated product.

Still another embodiment provides a negative electrode for a rechargeable lithium battery including a current collector and a negative active material layer formed on the current collector, including the negative active material.

The negative active material layer may include the negative active material according to one embodiment as a first negative active material, and crystalline carbon as a second negative active material. When the negative active material layer further includes crystalline carbon as the second negative active material, a peak intensity ratio ($I_{lithium\ silicate\ (020)}/I_{graphite\ (002)}$) of peak intensity ($I_{lithium\ silicate\ (020)}$) at a lithium silicate (020) plane to peak intensity ($I_{graphite\ (002)}$) at a graphite (002) plane may be 0.01 to 0.5 in X-ray diffraction analysis to the negative electrode using a CuKα ray. When the peak intensity ratio ($I_{Li2SiO3\ (020)}/I_{graphite\ (002)}$) is within the range, the electrical resistance characteristics may be improved.

In the negative active material layer, an amount of the negative active material may be 95 wt % to 99 wt % based on the total weight of the negative active material layer.

In addition, when the crystalline carbon is used as the second negative active material, a mixing ratio of the first negative active material and the second negative active material may be 1:99 to 30:70 by weight ratio. When the mixing ratio is within the range, high-capacity and high power merits may be obtained. The negative active material layer may include a binder, and optionally a conductive material.

In the negative active material layer, an amount of the binder may be 1 wt % to 5 wt % based on the total weight of the negative active material layer. Furthermore, in case of further including the conductive material, the negative active material may be included in an amount of 90 wt % to 98 wt %, the binder may be included in an amount of 1 wt % to 5 wt %, and the conductive material may be included in an amount of 1 wt % to 5 wt %.

The binder improves binding properties of negative active material particles with one another and with a current collector. The binder includes a non-aqueous binder, an aqueous binder, or a combination thereof.

The non-aqueous binder may be an ethylene propylene copolymer, polyacrylonitrile, polystyrene, polyvinylchloride, carboxylated polyvinylchloride, polyvinylfluoride, polyurethane, polytetrafluoroethylene, polyvinylidene fluoride, polyethylene, polypropylene, polyamideimide, polyimide, or a combination thereof.

The aqueous binder may include a styrene-butadiene rubber, an acrylated styrene-butadiene rubber, an acrylonitrile-butadiene rubber, an acrylic rubber, a butyl rubber, a fluorine rubber, an ethylene oxide-containing polymer, polyvinylpyrrolidone, polyepichlorohydrin, polyphosphazene, an ethylene propylene diene copolymer, polyvinylpyridine, chlorosulfonated polyethylene, latex, a polyester resin, an acrylic resin, a phenolic resin, an epoxy resin, polyvinyl alcohol, or a combination thereof.

When the aqueous binder is used as a negative electrode binder, a cellulose-based compound may be further used to provide viscosity as a thickener. The cellulose-based compound includes one or more of carboxymethyl cellulose, hydroxypropyl methyl cellulose, methyl cellulose, or alkali metal salts thereof. The alkali metal may be Na, K, or Li. The thickener may be included in an amount of about 0.1 parts by weight to about 3 parts by weight based on 100 parts by weight of the negative active material.

The conductive material is included to provide electrode conductivity, and any electrically conductive material may be used as a conductive material unless it causes a chemical change. Examples of the conductive material may be a carbon-based material such as natural graphite, artificial graphite, carbon black, acetylene black, ketjen black, a carbon fiber, and the like; a metal-based material of a metal powder or a metal fiber including copper, nickel, aluminum, silver, and the like; a conductive polymer such as a polyphenylene derivative; or a mixture thereof.

The current collector may include one selected from a copper foil, a nickel foil, a stainless steel foil, a titanium foil, a nickel foam, a copper foam, a polymer substrate coated with a conductive metal, and a combination thereof, but is not limited thereto.

Still another embodiment provides a rechargeable lithium battery including the negative electrode, a positive electrode, and a non-aqueous electrolyte.

The positive electrode includes a current collector and a positive active material layer including a positive active material formed on the current collector. The positive electrode active material may include lithiated intercalation compounds that reversibly intercalate and deintercalate lithium ions, and specifically, one or more composite oxides of a metal selected from cobalt, manganese, nickel, and a combination thereof, and lithium, may be used. More specifically, the compounds represented by one of the following chemical formulae may be used. $Li_aA_{1-b}X_bD_2$ ($0.90 \leq a \leq 1.8$, $0 \leq b \leq 0.5$); $Li_aA_{1-b}X_bO_{2-c}D_c$ ($0.90 \leq a \leq 1.8$, $0 \leq b \leq 0.5$, $0 \leq c \leq 0.05$); $Li_aE_{11-b}X_bO_{2-c}D_c$ ($0 \leq b \leq 0.5$, $0 \leq c \leq 0.05$); $Li_aE_{2-b}A_bO_{4-c}D_c$ ($0 \leq b \leq 0.5$, $0 \leq c \leq 0.05$); $Li_aNi_{1-b-c}Co_bX_cD_\alpha$ ($0.90 \leq a \leq 1.8$, $0 \leq b \leq 0.5$, $0 \leq c \leq 0.5$, $0 < \alpha \leq 2$); $Li_aNi_{1-b-c}Co_bX_cO_{2-\alpha}T_\alpha$ ($0.90 \leq a \leq 1.8$, $0 \leq b \leq 0.5$, $0 \leq c \leq 0.5$, $0 < \alpha < 2$); $Li_aNi_{1-b-c}Co_bX_cO_{2-\alpha}T_\alpha$ ($0.90 \leq a \leq 1.8$, $0 \leq b \leq 0.5$, $0 \leq c \leq 0.5$, $0 < \alpha < 2$); $Li_aNi_{1-b-c}Mn_bX_cD_\alpha$ ($0.90 \leq a \leq 1.8$, $0 \leq b \leq 0.5$, $0 \leq c \leq 0.5$, $0 < \alpha \leq 2$); $Li_aNi_{1-b-c}Mn_bX_cO_{2-\alpha}T_\alpha$ ($0.90 \leq a \leq 1.8$, $0 \leq b \leq 0.5$, $0 \leq c \leq 0.5$, $0 < \alpha \leq 2$); $Li_aNi_{1-b-c}Mn_bX_cO_{2-\alpha}T_\alpha$ ($0.90 \leq a \leq 1.8$, $0 \leq b \leq 0.5$, $0 \leq c \leq 0.5$, $0 < \alpha < 2$); $Li_aNi_bE_cG_dO_2$ ($0.90 \leq a \leq 1.8$, $0 \leq b \leq 0.9$, $0 \leq c \leq 0.5$, $0.001 \leq d \leq 0.1$); $Li_aNi_bCo_cMn_dG_eO_2$ ($0.90 \leq a \leq 1.8$, $0 \leq b \leq 0.9$, $0 \leq c \leq 0.5$, $0 \leq d \leq 0.5$, $0.001 \leq e \leq 0.1$); $Li_aNiG_bO_2$ ($0.90 \leq a \leq 1.8$, $0.001 \leq b \leq 0.1$) $Li_aCoG_bO_2$ ($0.90 \leq a \leq 1.8$, $0.001 \leq b \leq 0.1$); $Li_aMn_{1-b}G_bO_2$ ($0.90 \leq a \leq 1.8$, $0.001 \leq b \leq 0.1$); $Li_aMn_2G_bO_4$ ($0.90 \leq a \leq 1.8$, $0.001 \leq b \leq 0.1$); $Li_aMn_{1-g}G_gPO_4$ ($0.90 \leq a \leq 1.8$, $0 \leq g \leq 0.5$); $QO_2$; $QS_2$; $LiQS_2$; $V_2O_5$; $LiV_2O_5$; $LiZO_2$; $LiNiVO_4$; $Li_{(3-f)}J_2PO_{43}$ ($0 \leq f \leq 2$); $Li_{(3-f)}Fe_2PO_{43}$ ($0 \leq f \leq 2$); $Li_aFePO_4$ ($0.90 \leq a \leq 1.8$)

In the above chemical formulae, A is selected from Ni, Co, Mn, and a combination thereof; X is selected from Al, Ni, Co, Mn, Cr, Fe, Mg, Sr, V, a rare earth element, and a combination thereof; D is selected from O, F, S, P, and a combination thereof; E is selected from Co, Mn, and a combination thereof; T is selected from F, S, P, and a combination thereof; G is selected from Al, Cr, Mn, Fe, Mg, La, Ce, Sr, V, and a combination thereof; Q is selected from Ti, Mo, Mn, and a combination thereof; Z is selected from Cr, V, Fe, Sc, Y, and a combination thereof; and J is selected from V, Cr, Mn, Co, Ni, Cu, and a combination thereof. Also, the compounds may have a coating layer on the surface, or may be mixed with another compound having a coating layer.

The coating layer may include at least one coating element compound selected from the group consisting of an oxide of a coating element, a hydroxide of a coating element, an oxyhydroxide of a coating element, an oxycarbonate of a coating element, and a hydroxyl carbonate of a coating element. The compound for the coating layer may be amorphous or crystalline. The coating element included in the coating layer may include Mg, Al, Co, K, Na, Ca, Si, Ti, V, Sn, Ge, Ga, B, As, Zr, or a mixture thereof. The coating layer may be disposed in a method having no adverse influence on properties of a positive electrode active material by using these elements in the compound, and for example, the method may include any coating method such as spray coating, dipping, and the like, but is not illustrated in more detail since it is well-known in the related field.

In the positive electrode, an amount of the positive active material may be about 90 wt % to about 98 wt % based on the total weight of the positive active material layer.

In one embodiment, the positive active material layer may further include a binder and a conductive material. Herein, the amount of the binder and the conductive material may be 1 wt % to 5 wt %, respectively, based on the total amount of the positive active material layer.

The binder improves binding properties of positive active material particles with one another and with a current collector. The examples of the binder may be polyvinyl alcohol, carboxymethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, styrene butadiene rubber, acrylated styrene butadiene rubber, an epoxy resin, nylon, and the like, but are not limited thereto.

The conductive material is included to provide electrode conductivity, and any electrically conductive material may be used as a conductive material unless it causes a chemical change. Examples of the conductive material include a carbon-based material such as natural graphite, artificial graphite, carbon black, acetylene black, ketjen black, a carbon fiber, and the like; a metal-based material of a metal powder or a metal fiber including copper, nickel, aluminum, silver, and the like; a conductive polymer such as a polyphenylene derivative; or a mixture thereof.

The current collector may use an aluminum foil, a nickel foil, or a combination thereof, but is not limited thereto.

The positive active material layer and the negative active material layer may be formed by mixing an active material, a binder, and optionally a conductive material, in a solvent to prepare an active material composition, and coating the active material composition on a current collector. Such an active material layer preparation method is well known and thus is not described in detail in the present specification. The solvent includes N-methyl pyrrolidone and the like, but is not limited thereto. In addition, when the binder is a water-soluble binder in the negative active material layer, the solvent may be water.

The electrolyte includes a non-aqueous organic solvent and a lithium salt.

The non-aqueous organic solvent serves as a medium for transmitting ions taking part in the electrochemical reaction of a battery.

The non-aqueous organic solvent may include a carbonate-based, ester-based, ether-based, ketone-based, alcohol-based, or aprotic solvent.

The carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like. The ester-based solvent may include methyl acetate, ethyl acetate, n-propyl acetate, dimethyl acetate, methyl propionate, ethyl propionate, decanolide, mevalonolactone, caprolactone, and the like. The ether-based solvent may include dibutyl ether, tetraglyme, diglyme, dimethoxyethane, 2-methyltetrahydrofuran, tetrahydrofuran, and the like. Furthermore, the ketone-based solvent may include cyclohexanone and the like. In addition, the alcohol-based solvent may include ethyl alcohol, isopropyl alcohol, and the like, and examples of the aprotic solvent may include nitriles such as R—CN (where R is a C2 to C20 linear, branched, or cyclic hydrocarbon, or may include a double bond, an aromatic ring, or an ether bond), amides such as dimethylformamide, dioxolanes such as 1,3-dioxolane, sulfolanes, and the like.

The organic solvent may be used alone or in a mixture. When the organic solvent is used in a mixture, the mixture ratio may be controlled in accordance with a desirable battery performance and it may be well understood to one of ordinary skill in the related art.

Furthermore, the carbonate-based solvent may include a mixture of a cyclic carbonate and a linear carbonate. Herein, when the mixture of cyclic carbonate and linear carbonate mixed together in a volume ratio of about 1:1 to about 1:9 is used as an electrolyte, it may have enhanced performance.

When the non-aqueous organic solvent is mixed and used, a mixed solvent of a cyclic carbonate and a chain carbonate, a mixed solvent of a cyclic carbonate and a propionate-based solvent, or a mixed solvent of a cyclic carbonate, a chain carbonate, and a propionate-based solvent may be used. The propionate-based solvent may be methyl propionate, ethyl propionate, propyl propionate, or a combination thereof. Herein, when the cyclic carbonate and the chain carbonate or the cyclic carbonate and the propionate-based solvent are mixed, they may be mixed in a volume ratio of about 1:1 to about 1:9 and thus performance of an electrolyte solution may be improved. In addition, when the cyclic carbonate, the chain carbonate, and the propionate-based solvent are mixed, they may be mixed in a volume ratio of about 1:1:1 to about 3:3:4. The mixing ratios of the solvents may be appropriately adjusted according to desirable properties.

The non-aqueous organic solvent may further include an aromatic hydrocarbon-based organic solvent in addition to the carbonate-based solvent. Herein, the carbonate-based solvent and the aromatic hydrocarbon-based organic solvent may be included at a ratio of 1:1 to 30:1 by volume.

The aromatic hydrocarbon-based organic solvent may be an aromatic hydrocarbon-based compound of Chemical Formula 1.

[Chemical Formula 1]

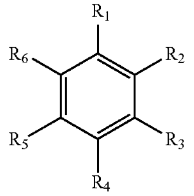

(In Chemical Formula 1, $R_1$ to $R_6$ are the same or different and are selected from hydrogen, a halogen, a C1 to C10 alkyl group, a haloalkyl group, and a combination thereof.)

Specific examples of the aromatic hydrocarbon-based organic solvent may be selected from benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof.

The electrolyte may further include an additive of vinylene carbonate or an ethylene carbonate-based compound of Chemical Formula 3 in order to improve cycle-life of a battery.

[Chemical Formula 2]

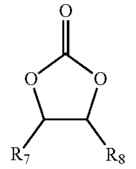

(In Chemical Formula 2, $R_7$ and $R_8$ are the same or different, and are selected from hydrogen, a halogen, a cyano group (CN), a nitro group ($NO_2$), and a fluorinated C1 to C5 alkyl group, provided that at least one of $R_7$ and $R_8$ is selected from a halogen, a cyano group (CN), a nitro group ($NO_2$), and a fluorinated C1 to C5 alkyl group, and both $R_7$ and $R_8$ are not hydrogen.)

Examples of the ethylene carbonate-based compound may include difluoro ethylene carbonate, chloroethylene carbonate, dichloroethylene carbonate, bromoethylene carbonate, dibromoethylene carbonate, nitroethylene carbonate, cyanoethylene carbonate, and fluoroethylene carbonate. The amount of the additive for improving a cycle-life may be used within an appropriate range.

The electrolyte may further include vinyl ethylene carbonate, propane sultone, succinonitrile, or a combination thereof, and the amount used may be appropriately adjusted.

The lithium salt dissolved in an organic solvent supplies a battery with lithium ions, basically operates the rechargeable lithium battery, and improves transportation of the lithium ions between positive and negative electrodes. Examples of the lithium salt include one or two or more supporting salts selected from $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $LiC_4F_9SO_3$, $LiClO_4$, $LiAlo_2$, $LiAlCl_4$, $LiPO_2F_2$, $(C_xF_{2x+1}SO_2)(C_yF_{2y+1}SO_2)$, wherein, x and y are natural numbers, for example an integer ranging from 1 to 20, lithium difluoro(bisoxolato) phosphate), LiCl, LiI, LiB $(C_2O_4)_2$ (lithium bis(oxalato) borate: LiBOB), lithium difluoro(oxalato)borate (LiDFOB). A concentration of the lithium salt may range from about 0.1 M to about 2.0 M. When the lithium salt is included at the above concentration range, an electrolyte may have excellent performance and lithium ion mobility due to optimal electrolyte conductivity and viscosity.

The rechargeable lithium battery may further include a separator between the negative electrode and the positive electrode, depending on a kind of the battery. Examples of a suitable separator material include polyethylene, polypropylene, polyvinylidene fluoride, and multi-layers thereof such as a polyethylene/polypropylene double-layered separator, a polyethylene/polypropylene/polyethylene triple-layered separator, and a polypropylene/polyethylene/polypropylene triple-layered separator.

Figure 2:
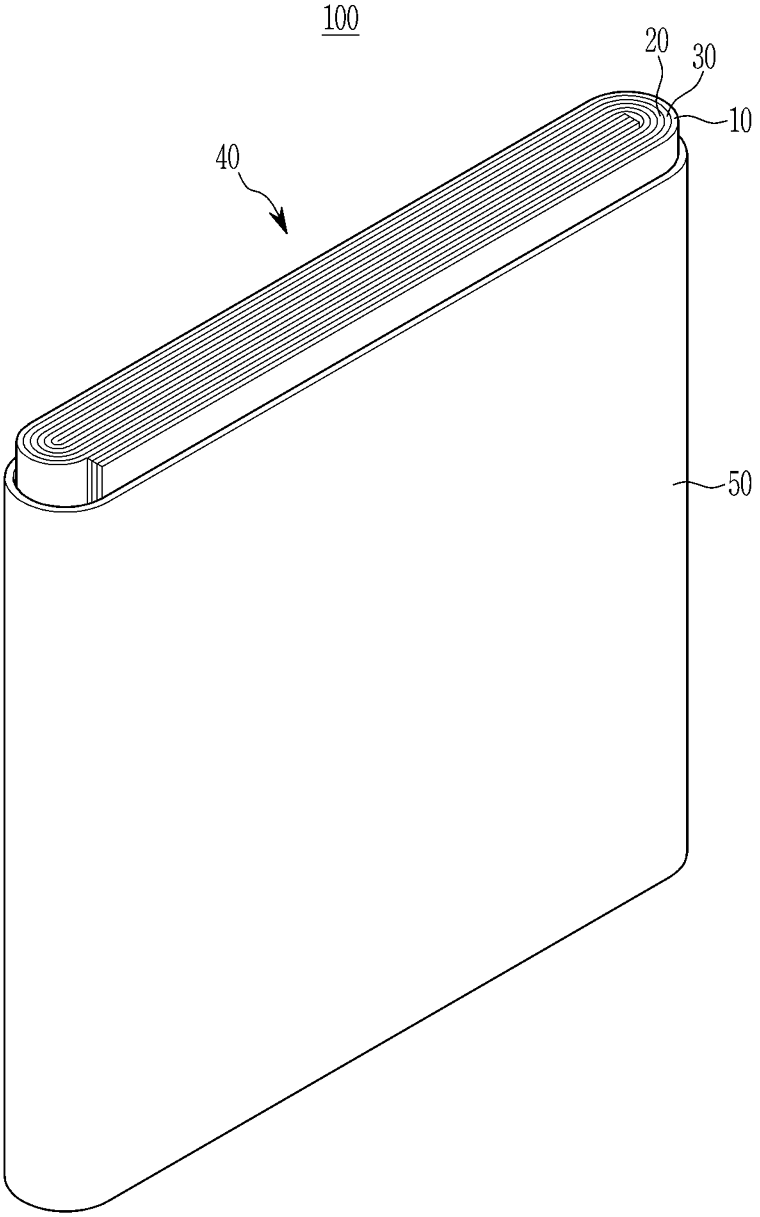
FIG. 2 is a schematic view of a rechargeable lithium battery according to another embodiment.

FIG. 2 is an exploded perspective view of a rechargeable lithium battery according to one embodiment. The rechargeable lithium battery according to an embodiment is illustrated as a prismatic battery but is not limited thereto, and may include variously-shaped batteries such as a cylindrical battery, a pouch battery, and the like.

Referring to FIG. 2, a rechargeable lithium battery 100 according to an embodiment includes an electrode assembly 40 manufactured by winding a separator 30 interposed between a positive electrode 10 and a negative electrode 20, and a case 50 housing the electrode assembly 40. An electrolyte (not shown) may be impregnated in the positive electrode 10, the negative electrode 20, and the separator 30.

MODE FOR PERFORMING THE INVENTION

Hereinafter, examples of the present invention and comparative examples are described. These examples, however, are not in any sense to be interpreted as limiting the scope of the invention.

Example 1

An anhydrous ethanol organic solvent and silicon particles having a particle diameter of several micrometers were mixed at a 9:1 ratio by weight, and a silicon nanoparticle dispersed liquid was prepared by using a bead mill (Netzsch, Germany).

The silicon nanoparticle dispersed liquid and $Li_2CO_3$ were mixed in order to obtain a mixing ration of Si and $Li_2CO_3$ to be 9:1 by weight ratio. The obtained mixture was mixed with petroleum pitch, and herein, the amount of the first amorphous carbon precursor was 30 parts by weight based on 100 parts by weight of the mixed amount of Si and $Li_2CO_3$.

The resulting mixture was distributed using a homogenizer and spray-dried at 150° C. to prepare a spray-dried product.

The obtained spray-dried product was primarily heat-treated at 750° C. using a nitrogen furnace ($N_2$).

The primarily heat-treated product and petroleum pitch were mixed at a 70:30 ratio by weight, and then it was secondarily heat-treated at 750° C. to prepare a negative active material.

The prepared negative active material included an agglomerated product of silicon-based materials including silicon nanoparticles, lithium silicate positioned on the surface of the silicon nanoparticles, and a soft carbon first amorphous carbon surrounded on the silicon nanoparticles and the lithium silicate, and a soft carbon second amorphous carbon positioned on the agglomerated product. Herein, the average particle diameter, D50 of the silicon nanoparticles was 100 nm and the lithium silicate was $Li_2SiO_3$. In addition, the amount of lithium silicate was 6 wt % based on the total 100 wt % of the negative active material, the amount of the silicon nanoparticles was 54 wt % based on the total 100 wt % of the negative active material, and the amount of the soft carbon was 40 wt % based on the total 100 wt % of the negative active material.

Furthermore, the lithium silicate was positioned by continuously surrounding the surface of the silicon nanoparticles in the layer form, the first amorphous carbon and the second amorphous carbon were also positioned in order to continuously surround, and the thicknesses of the lithium silicate, the first amorphous carbon, and the second amorphous carbon were respectively 2 nm, 10 nm, and 10 nm.

Example 2

A negative active material was prepared by the same procedure as in Example 1, except that a primary heat-treatment was performed at 850° C.

The prepared negative active material included an agglomerated product of silicon-based materials including silicon nanoparticles, lithium silicate positioned on the surface of the silicon nanoparticles, and a soft carbon first amorphous carbon surrounded on the silicon nanoparticles and the lithium silicate, and a soft carbon second amorphous carbon positioned on the agglomerated product. Herein, the average particle diameter, D50 of the silicon nanoparticles was 100 nm, and the lithium silicate was $Li_2SiO_3$. In addition, the amount of lithium silicate was 6 wt % based on the total 100 wt % of the negative active material, the amount of the silicon nanoparticles was 54 wt % based on the total 100 wt % of the negative active material, and the amount of the soft carbon was 40 wt % based on the total 100 wt % of the negative active material.

Furthermore, the lithium silicate was positioned by continuously surrounding the surface of the silicon nanoparticles in the layer form, the first amorphous carbon and the second amorphous carbon were also positioned in order to continuously surround, and the thicknesses of the lithium silicate, the first amorphous carbon, and the second amorphous carbon were respectively 3 nm, 10 nm, and 10 nm.

Example 3

A negative active material was prepared by the same procedure as in Example 1, except that the silicon nanoparticle dispersed liquid and $Li_2CO_3$ were mixed in order to obtain a mixing ratio of Si and $Li_2CO_3$ to be 7:3 by weight ratio.

The prepared negative active material included an agglomerated product of silicon-based materials including silicon nanoparticles, lithium silicate positioned on the surface of the silicon nanoparticles, and a soft carbon first amorphous carbon surrounded on the silicon nanoparticles and the lithium silicate, and a soft carbon second amorphous carbon positioned on the agglomerated product. Herein, the average particle diameter D50 of the silicon nanoparticles was 100 nm, and the lithium silicate was $Li_2SiO_3$. In addition, the amount of lithium silicate was 18 wt % based on the total 100 wt % of the negative active material, the amount of the silicon nanoparticles was 42 wt % based on the total 100 wt % of the negative active material, and the amount of the soft carbon was 40 wt % based on the total 100 wt % of the negative active material.

Furthermore, the lithium silicate was positioned by continuously surrounding the surface of the silicon nanoparticles in the layer form, the first amorphous carbon and the second amorphous carbon were also positioned in order to continuously surround, and the thicknesses of the lithium silicate, the first amorphous carbon, and the second amorphous carbon were respectively, 6 nm, 10 nm, and 10 nm.

Example 4

A negative active material was prepared by the same procedure as in Example 3, except that a primary heat-treatment was performed at 850° C.

The prepared negative active material included an agglomerated product of silicon-based materials including silicon nanoparticles, lithium silicate positioned on the surface of the silicon nanoparticles, and a soft carbon first amorphous carbon surrounded on the silicon nanoparticles and the lithium silicate, and a soft carbon second amorphous carbon positioned on the agglomerated product. Herein, the average particle diameter D50 of the silicon nanoparticles was 100 nm and the lithium silicate was $Li_2SiO_3$. In addition, the amount of lithium silicate was 18 wt % based on the total 100 wt % of the negative active material, the amount of the silicon nanoparticles was 42 wt % based on the total 100 wt % of the negative active material, and the amount of the soft carbon was 40 wt % based on the total 100 wt % of the negative active material.

Furthermore, the lithium silicate was positioned by continuously surrounding the surface of the silicon nanoparticles in the layer form, the first amorphous carbon and the second amorphous carbon were also positioned in order to continuously surround, and the thicknesses of the lithium silicate, the first amorphous carbon, and the second amorphous carbon were respectively 9 nm, 10 nm, and 10 nm.

Comparative Example 1

An anhydrous ethanol organic solvent and silicon particles having a particle diameter of several micrometers were mixed at a ratio of 9:1 by weight and a silicon nanoparticle dispersed liquid was prepared by using bead mill (Netzsch, Germany).

The silicon nanoparticle dispersed liquid was mixed with petroleum pitch, and herein, the amount of the first amorphous carbon precursor was 60 parts by weight based on 100 parts by weight of the silicon nanoparticles.

The resulting mixture was distributed using a homogenizer and spray-dried at 150° C. to prepare a spray-dried product.

The obtained spray-dried product was primarily heat-treated at 750° C. using a nitrogen furnace ($N_2$).

The primarily heat-treated product and petroleum pitch were mixed at a ratio of 60:60 by weight, and then it was secondarily heat-treated at 950° C. to prepare a negative active material.

The prepared negative active material included an agglomerated product of silicon-based materials including silicon nanoparticles, and a soft carbon first amorphous carbon surrounded on the silicon nanoparticles, and a soft carbon second amorphous carbon positioned on the agglomerated product. Herein, the average particle diameter, D50 of the silicon nanoparticles was 100 nm, the amount of the silicon nanoparticles was 60 wt % based on the total 100 wt % of the negative active material, and the amount of the soft carbon was 40 wt % based on the total 100 wt % of the negative active material.

Furthermore, the first amorphous carbon and the second amorphous carbon were also positioned in order to continuously surround, and the thicknesses of the silica, the first amorphous carbon, and the second amorphous carbon were respectively 2 nm, 10 nm, and 10 nm.

Comparative Example 2

A negative active material was prepared by the same procedure as in Example 3, except that a primary heat-treatment was performed at 1000° C.

The prepared negative active material included an agglomerated product of silicon-based materials including silicon nanoparticles, lithium silicate positioned on the surface of the silicon nanoparticles, and a soft carbon first amorphous carbon surrounded on the silicon nanoparticles and the lithium silicate, a soft carbon second amorphous carbon positioned on the agglomerated product, and SiC (silicon carbide) totally distributed. Herein, the average particle diameter D50 of the silicon nanoparticles was 100 nm and the lithium silicate was $Li_2SiO_3$. In addition, the amount of lithium silicate was 3 wt % based on the total 100 wt % of the negative active material, the amount of the silicon nanoparticles was 42 wt % based on the total 100 wt % of the negative active material, and the amount of the soft carbon was 40 wt % based on the total 100 wt % of the negative active material. The amount of SiC (silicon carbide) was 15 wt % based on the total 100 wt % of the negative active material.

Furthermore, the lithium silicate was positioned by continuously surrounding the surface of the silicon nanoparticles in the layer form, the first amorphous carbon and the second amorphous carbon were also positioned in order to continuously surround, and the thicknesses of the lithium silicate, the first amorphous carbon and the second amorphous carbon were respectively, 1 nm, 10 nm, and 10 nm.

Comparative Example 3

A negative active material was prepared by the same procedure as in Example 1, except that $SiO_x$ (x=0.95) particles having an average particle diameter D50 of 200 nm was used instead of silicon nanoparticles.

The prepared negative active material included an agglomerated product of silicon-based materials including $SiO_x$ (x=0.95) particles, lithium silicate positioned on the surface of the $SiO_x$ (x=0.95) particles, and a soft carbon first amorphous carbon surrounded on the $SiO_x$ (x=0.95) particles and the lithium silicate, and a soft carbon second amorphous carbon positioned on the agglomerated product. Herein, the average particle diameter D50 of the $SiO_x$ (x=0.95) particles was 200 nm and the lithium silicate was $Li_2SiO_3$. In addition, the amount of lithium silicate was 6 wt % based on the total 100 wt % of the negative active material, the amount of the $SiO_x$ (x=0.95) particles was 54 wt % based on the total 100 wt % of the negative active material, and the amount of the soft carbon was 40 wt % based on the total 100 wt % of the negative active material.

Furthermore, the lithium silicate was positioned by continuously surrounding the surface of the particles in the layer form, the first amorphous carbon and the second amorphous carbon were also positioned in order to continuously surround, and the thicknesses of the lithium silicate, the first amorphous carbon, and the second amorphous carbon were respectively 3 nm, 10 nm, and 10 nm.

Comparative Example 4

50 wt % of the active material prepared in Comparative Example 1 was mixed with 50 wt % of $SiO_x$ (x=0.95) having an average particle diameter D50 of 6 μm to prepare a negative active material.

Experimental Example 1: X-Ray Diffraction Analysis Result

Figure 3:
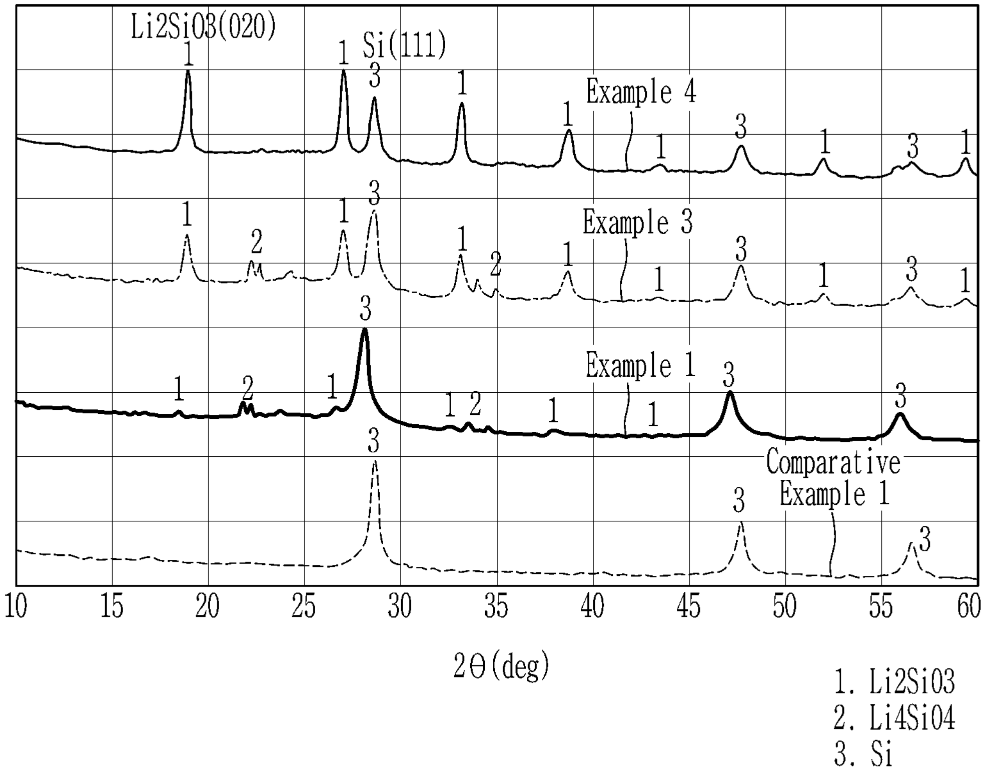
FIG. 3 is a graph showing X-ray diffraction analysis results of the negative active materials for the rechargeable lithium cells according to Examples 1, 3, and 4, and Comparative Example 1.

As for the negative active materials according to Examples 1 to 4 and Comparative Examples 1 to 4, the X-ray diffraction analysis (XRD) was performed by using a CuKα ray, and the results of Examples 1 and 2, and Comparative Example 1 among the obtained results are shown in FIG. 3. X-ray diffraction analysis was measured from X'Pert (PANalytical B.V.) XRD equipment using a CuKα ray as a target ray, but monochromator equipment was removed in order to improve a peak intensity resolution. Herein, the measurement was performed under a condition of 2θ=10° to 80°, a scan speed (°/S)=0.06436, and a step size of 0.026°/step.

As shown in FIG. 3, Comparative Example 1 exhibited no peak related with $Li_2CO_3$ which was not used in the active material preparation, and from the results of Example 1, 3, and 4, it can be seen that as the used amount of $Li_2CO_3$ is increased in the active material preparation, a $Li_2SiO_3$ (020) peak is increased. In addition, although the same amount is used, the peak intensity at 2θ of 21° to 25° depended on the heat treatment temperature.

From these results, the peak intensity ratio ($I_{Li2SiO3\ (010)}/I_{Si\ (111)}$) of peak intensity ($I_{Li2SiO3(020)}$) at a $Li_2SiO_3$ (020) plane to peak intensity ($I_{Si\ (111)}$) at a Si(111) plane, and the peak intensity ratio ($I_b/I_a$) of peak intensity ($I_b$) at θ of 15° to 20° to peak intensity ($I_a$) at θ of 21° to 25° were measured, and the results are shown in Table 1.

TABLE 1

| | Peak Intensity Ratio ($I_{Li2SiO3(010)}/I_{Si\ (111)}$) |
|---|---|
| Example 1 | 0.29 |
| Example 2 | 0.39 |
| Example 3 | 0.83 |
| Example 4 | 1.11 |
| Comparative Example 1 | 0.17 |
| Comparative Example 2 | 1.51 |
| Comparative Example 3 | 1.49 |
| Comparative Example 4 | 0.29 |

Example 5

A negative electrode was prepared by the following procedure by using the negative active material of Example 1 as a first negative active material.

96 wt % of a mixed negative active material of the first negative active material, a natural graphite second negative active material (15:85 weight ratio), 2 wt % of a styrene-butadiene rubber binder, and 2 wt % of carboxymethyl cellulose were mixed in a water solvent to prepare a negative active material slurry.

The negative active material slurry was coated on a copper foil, dried, and pressurized to prepare a negative electrode including a negative active material formed on the copper foil current collector.

Using the negative electrode, a lithium metal counter electrode, and an electrolyte solution, a half-cell was fabricated according to the conventional technique. As the electrolyte solution, 1.0M $LiPF_6$ dissolved in a mixed solvent of ethylene carbonate, diethyl carbonate, and dimethyl carbonate (3/5/2 by volume) was used.

Example 6

A half-cell was fabricated by the same procedure as in Example 5, except that the negative active material according to Example 2 was used as a first negative active material.

Example 7

A half-cell was fabricated by the same procedure as in Example 5, except that the negative active material according to Example 3 was used as a first negative active material.

Example 8

A half-cell was fabricated by the same procedure as in Example 5, except that the negative active material according to Example 4 was used as a first negative active material.

Comparative Example 5

A half-cell was fabricated by the same procedure as in Example 5, except that the negative active material according to Comparative Example 1 was used as a first negative active material.

Comparative Example 6

A half-cell was fabricated by the same procedure as in Example 5, except that the negative active material according to Comparative Example 2 was used as a first negative active material.

Comparative Example 8

A half-cell was fabricated by the same procedure as in Example 5, except that the negative active material according to Comparative Example 4 was used as a first negative active material.

Experimental Example 2: Evaluation of X-Ray Diffraction Characteristic

As for the negative electrode according to Examples 5 to 8 and Comparative Examples 3 to 8, the X-ray diffraction analysis (XRD) was performed by using a CuKα ray. X-ray diffraction analysis was measured from X'Pert (PANalytical B.V.) XRD equipment using a CuKα ray as a target ray, but monochromator equipment was removed in order to improve a peak intensity resolution. Herein, the measurement was performed under a condition of 2θ=10° to 80°, a scan speed (°/S)=0.06436, and a step size of 0.026°/step.

From these results, the peak intensity ratio ($I_{Li2SiO3\ (010)}/I_{graphite\ (002)}$) of peak intensity ($I_{Li2SiO3(020)}$) at a $Li_2SiO_3$ (020) plane to peak intensity ($I_{graphite\ (002)}$) at a graphite (002) plane was measured, and the results are shown in Table 2.

TABLE 2

| | Peak intensity ratio ($I_{Li2SiO3\ (010)}/I_{graphite\ (002)}$) |
|---|---|
| Example 5 | 0.045 |
| Example 6 | 0.059 |
| Example 7 | 0.131 |
| Example 8 | 0.191 |
| Comparative Example 5 | 0.021 |
| Comparative Example 6 | 0.232 |
| Comparative Example 7 | 0.224 |
| Comparative Example 8 | 0.044 |

As shown in Table 2, in the cells of Examples 5 to 8 using the negative active materials of Example 1 to 4, the negative electrode exhibited the peak intensity ratio ($I_{lithium\ silicate\ (020)}/I_{graphite\ (002)}$) within the range of 0.03 to 0.2, but Comparative Examples 5 to 7 using the negative active materials of Comparative Example 1 to 3 exhibited a peak intensity ratio which was out of the range.

Experimental Example 3: Evaluation of Capacity and Efficiency

The specific capacities of the half-cells according to Examples 5 to 8 and Comparative Examples 5 to 8 were measured and the results are shown in Table 3.

In addition, the halt-cells according to Examples 5 to 8 and Comparative Examples 5 to 8 were charged and discharged once at 0.1 C to obtain the charge and discharge efficiency, and the results are shown in Table 3.

Experimental Example 4: Evaluation of Cycle-Life Characteristics

The half-cells according to Examples 5 to 8 and Comparative Examples 5 to 8 were charged and discharged at 1 C 100 times to measure a ratio of discharge capacity at $100^{th}$ to discharge capacity at $1^{st}$, and the results are shown in Table 3 as capacity retention.

TABLE 3

| | Specific capacity (mAh/g) | Efficiency (%) | Capacity retention (%) |
|---|---|---|---|
| Example 5 | 1510 | 88 | 83 |
| Example 6 | 1505 | 89 | 84 |
| Example 7 | 1210 | 87 | 80 |
| Example 8 | 1160 | 87 | 82 |
| Comparative Example 5 | 1610 | 84 | 79 |
| Comparative Example 6 | 760 | 82 | 74 |
| Comparative Example 7 | 1440 | 79 | 77 |
| Comparative Example 8 | 1522 | 82 | 78 |

As shown in Table 3, the half-cells according to Examples 5 to 8 using the negative active materials of Examples 1 to 4 prepared by using $Li_2CO_3$ in active material preparation exhibited high specific capacity and excellent efficiency and capacity retention.

Whereas, the half-cell according to Comparative Example 5 using the negative active material of Comparative Example 1 using no $Li_2CO_3$ in the active material preparation exhibited good specific capacity and suitable capacity retention, but extremely deteriorated efficiency, and the half-cell according to Comparative Example 6 using the negative active material of Comparative Example 2 having the peak intensity ratio of 1.51 due the heat-temperature at too high temperatures, even though $Li_2CO_3$ was used in the active material preparation, exhibited very low specific capacity, and too poor efficiency and capacity retention.

In addition, the half-cell according to Comparative Example 7 using the negative active material of Comparative Example 3 using $SiO_x$ rather than silicon nanoparticles, exhibited reduced capacity and rare improvement in efficiency. Furthermore, the half-cell according to Comparative Example 8 using the negative active material of Comparative Example 4 in which $SiO_x$ was mixed, exhibited insufficient improvement in efficiency and cycle-life.

While this invention has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims. Therefore, the aforementioned embodiments should be understood to be examples but not limiting the present invention in any way.

The invention claimed is:

1. A negative active material for a rechargeable lithium battery, the negative active material comprising:

an agglomerated product of silicon-based materials including a silicon particle, a lithium silicate directly surrounding a surface of the silicon particle, and a first amorphous carbon surrounding the silicon particle and the lithium silicate; and a second amorphous carbon positioned on the agglomerated product, wherein the silicon particle has a nanosize.

2. The negative active material for a rechargeable lithium battery of claim 1, wherein the silicon particle has a particle diameter of 5 nm to 300 nm.

3. The negative active material for a rechargeable lithium battery of claim 1, wherein a peak intensity ratio ($I_{lithium\ silicate\ (020)}/I_{Si\ (111)}$) of a peak intensity ($I_{lithium\ silicate\ (020)}$) at a lithium silicate (020) plane to a peak intensity ($I_{Si\ (111)}$) at a Si (111) plane is 0.1 to 1.2, when X-ray diffraction analysis is measured for the negative active material for the rechargeable lithium battery using a CuKα ray.

4. The negative active material for a rechargeable lithium battery of claim 1, wherein the lithium silicate is $Li_2SiO_3$, $Li_4SiO_4$, $Li_2Si_2O_5$, or combinations thereof.

5. The negative active material for a rechargeable lithium battery of claim 1, wherein the agglomerated product further includes crystalline carbon.

6. The negative active material for a rechargeable lithium battery of claim 1, wherein an amount of the lithium silicate is 0.1 wt % to 20 wt % based on a total weight of the negative active material for the rechargeable lithium battery.

7. The negative active material for a rechargeable lithium battery of claim 1, wherein:

the lithium silicate forms a layer directly on and completely surrounding the surface of the silicon particle, and the first amorphous carbon forms a layer directly on and completely surrounding a surface of the lithium silicate layer.

8. The negative active material for a rechargeable lithium battery of claim 1, wherein:

the second amorphous carbon forms a layer directly on and completely surrounding a surface of the agglomerated product, and the thickness of the second amorphous carbon layer is 1 nm to 100 nm.

9. The negative active material for a rechargeable lithium battery of claim 1, wherein the thickness of the first amorphous carbon layer is 1 nm to 100 nm.

10. A negative electrode for a rechargeable lithium battery, comprising:

a current collector; and a negative active material layer including the negative active material of claim 1.

11. The negative electrode for a rechargeable lithium battery of claim 10, wherein the negative active material layer further comprises a crystalline carbon negative active material.

12. The negative electrode for a rechargeable lithium battery of claim 10, wherein, in an X-ray diffraction analysis of the negative electrode of the rechargeable lithium battery using a CuKα ray, a peak intensity ratio ($I_{lithium\ silicate\ (020)}/I_{graphite\ (002)}$) of a peak intensity ($I_{lithium\ silicate\ (020)}$)) at a lithium silicate (020) plane to a peak intensity ($I_{graphite\ (002)}$) at a graphite (002) plane is 0.01 to 0.5.

13. A rechargeable lithium battery, comprising:

the negative electrode of claim 10;

a positive electrode including a positive active material; and a non-aqueous electrolyte.

* * * * *